United States Patent [19]
Tai et al.

[11] Patent Number: 5,926,601
[45] Date of Patent: *Jul. 20, 1999

[54] STACKED BACKLIGHTING SYSTEM USING MICROPRISMS

[75] Inventors: Chen-Yu Tai; Ping-Kaung Tai, both of Toledo, Ohio

[73] Assignee: Briteview Technologies, Inc., Holland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/640,552

[22] Filed: May 2, 1996

[51] Int. Cl.⁶ .................................................. G02B 6/10
[52] U.S. Cl. ........................... 385/146; 385/36; 385/901; 349/62; 349/64; 362/32
[58] Field of Search ..................... 385/33, 131, 146, 385/901, 36; 349/62, 64, 65; 362/26, 31, 32

[56] References Cited

U.S. PATENT DOCUMENTS

| | | | |
|---|---|---|---|
| 4,917,465 | 4/1990 | Conner et al. | 349/5 |
| 5,050,946 | 9/1991 | Hathaway et al. | 385/33 |
| 5,126,882 | 6/1992 | Oe et al. | 349/65 |
| 5,187,765 | 2/1993 | Muehlemann et al. | 385/115 |
| 5,202,950 | 4/1993 | Arego et al. | 385/146 |
| 5,226,105 | 7/1993 | Myers | 385/147 |
| 5,506,929 | 4/1996 | Tai et al. | 385/146 |

FOREIGN PATENT DOCUMENTS

| | | |
|---|---|---|
| 3825436 | 3/1989 | Germany. |
| 62-73206 | 4/1987 | Japan. |
| 0271301 | 11/1988 | Japan. |
| 0287803 | 11/1988 | Japan. |
| 5-313164 | 11/1993 | Japan ...................................... 349/64 |
| WO 94/24589 | 10/1994 | WIPO ...................................... 385/146 |

OTHER PUBLICATIONS

M.F. Weber, "Retroreflecting Sheet Polarizer", SID 92 Digest 427–429.

*Primary Examiner*—Hemang Sanghaui
*Attorney, Agent, or Firm*—Marger Johnson & McCollom, P.C.

[57] ABSTRACT

An assembly backlighting a liquid crystal flat panel display or other such arrangement requiring backlighting is disclosed herein. The assembly includes a plurality of light pipes and is capable of a multi-mode operation as well as achieving an enhanced dimming. This assembly is composed of two or more light pipes placed in a stacked configuration. Each light pipe has a set of specially configured microprisms which, cooperating with the light pipe, provides an efficient backlighting technique with a controllable degree of collimation. The disclosed assembly is particularly useful for displays which require a very bright backlighting, a wide dimming range and which must be capable of illuminating a given active area with light of different spectra.

15 Claims, 8 Drawing Sheets

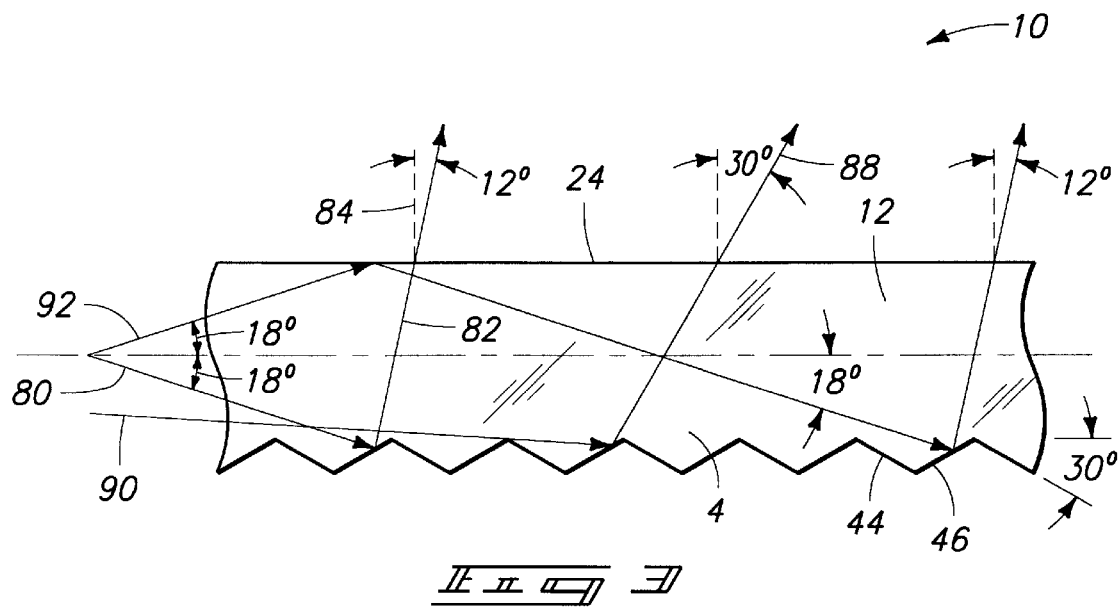
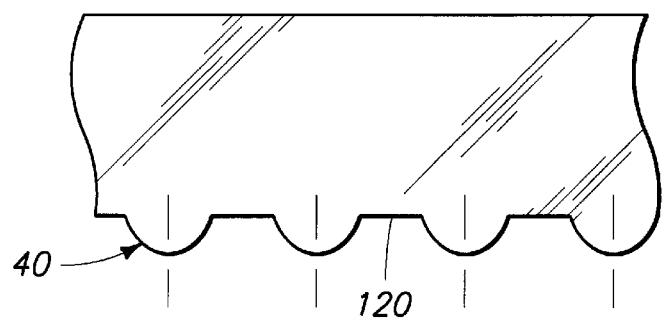

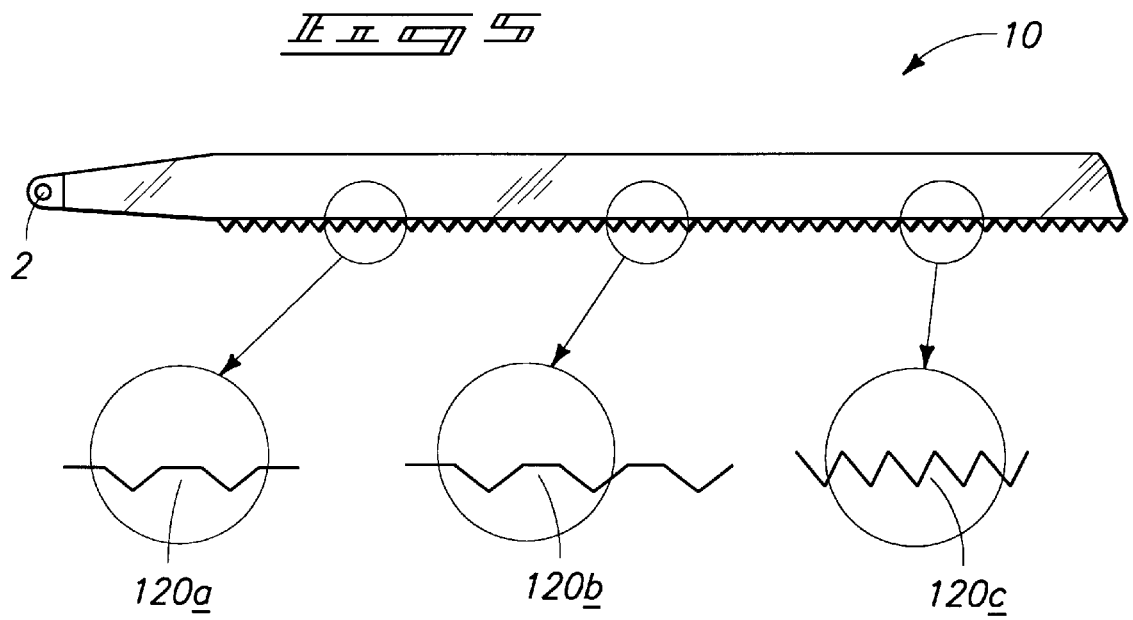
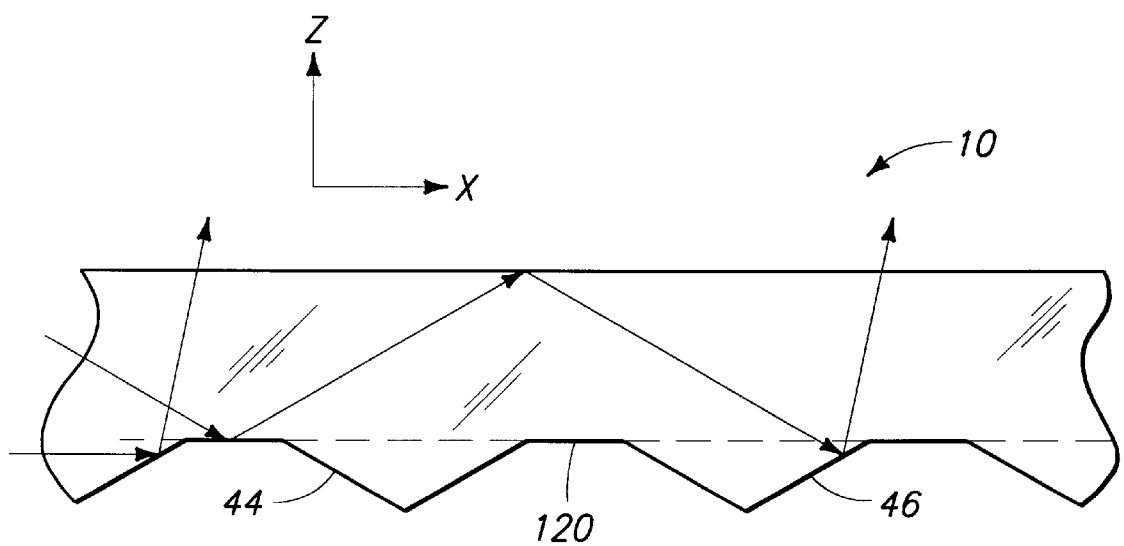

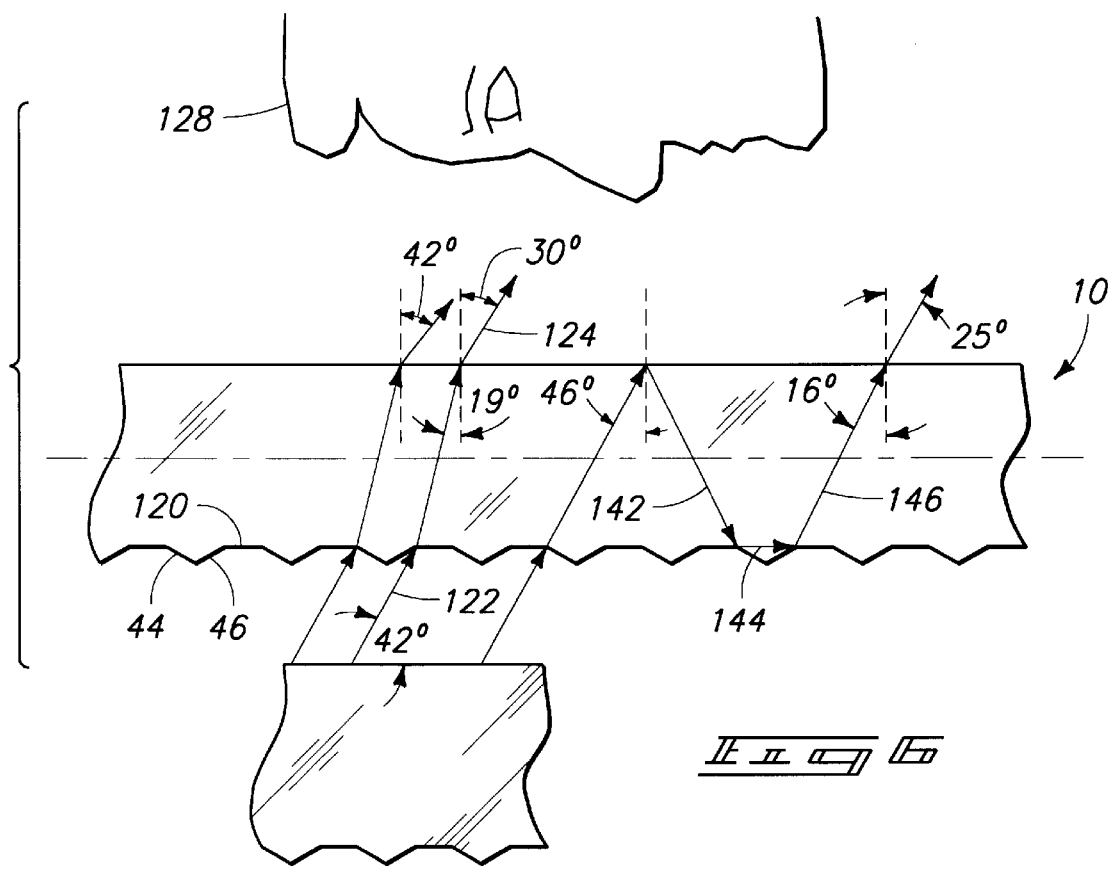

STACKED BACKLIGHTING SYSTEM USING MICROPRISMS

FIELD OF THE INVENTION

The invention relates generally to a backlighting system especially suitable for use with liquid crystal displays. More particularly, a light pipe assembly in accordance with this invention are configured for multi-mode and variable spectra operation.

BACKGROUND OF THE INVENTION

Liquid crystal displays are commonly used in portable computer systems, televisions, and other electronic display devices. Most of the large area, high performance LCDs require a source of light for operation. Backlighting the LCD has become the most popular source of light in LCD devices.

Backlighting of typical brightness uses scattering to transmit light. For a very high brightness backlighting system, typically a serpentine fluorescent lamp or a flat fluorescent lamp is used. Each of these light sources emits light in all directions and is not focused toward the display. As a result, the energy efficiency is low. Furthermore, a great deal of power is required which creates a power dissipation problem. Moreover, these prior technologies are not suitable for a stacked configuration and are incapable of illuminating a given active area of a display with light of different spectra efficiently.

The technologies described in U.S. Pat. No. 5,359,691 and U.S. Pat. No. 5,390,276, entitled "Backlighting System with a Multi-Reflection Light Injection System and Using Microprisms" and "Backlighting Assembly Utilizing Microprisms and Especially Suitable for Use with a Liquid Crystal Display," issued Oct. 25, 1994 and Feb. 14, 1995, respectively, to Tai, et al., provides very efficient collimated backlighting. However, each technology includes a single light pipe, and thus operates in one mode. Therefore, with one light source, a single light pipe's light output is limited to a single spectra. Accordingly, the previous technology is not suitable for backlighting displays for outdoor applications or for use in conjunction with night vision goggles. Moreover, the dimming ratio of a single light pipe configuration is low.

A multi-mode operation backlighting system is therefore desirable. Moreover, it would also be advantageous to have a high dimming ratio as well as the capability of spectral variation along with a high energy efficiency.

SUMMARY OF THE INVENTION

Using a stacked light pipe configuration, a backlighting assembly with a very high brightness is achieved. By selectively turning some lamps off, a very high dimming ratio is also achieved. With the use of one or more color filters, this backlighting system can illuminate a given area with light of different spectra but similar angular distribution.

Each light pipe is generally rectangular, and includes means for directing light into the light pipe from one or more sides. The light moves from one end of the light pipe towards the opposing end. An arrangement of immediately adjacent microprisms serves as the bottom surface of the light pipe, such reflecting light within the light pipe upwards and through the top surface by total internal reflection. Because of its use of total internal reflection, this light pipe is essentially transparent incident from outside the light pipe and can therefore be stacked for a very high brightness. More importantly, with a color filter placed between a lamp and one of the light pipes, this backlighting system produces light of two different spectra and therefore achieves a two-mode operation.

The capability of multi-mode operation is particularly important for applications where a night vision goggle is used. A night vision goggle is used to observe an infrared emitting object, such as a human being, in the dark. As a result, a display must not emit infrared or long wavelength red light to be compatible with the use of a night vision goggle. The day mode, on the other hand, needs a very bright output light with white color. Therefore, in one embodiment, two stacked light pipes are designed to have light from the lower light pipe transmit through the top light pipe efficiently with little change in the propagation direction of the output light.

BRIEF DESCRIPTION OF THE DRAWINGS

The present invention will be described in more detail hereafter in conjunction with the drawings, wherein:

FIGS. 3 and 3A are perspective views of sectional views of light pipes;

FIGS. 5 and 5A are perspective views a light pipe with the density of microprisms increasing away from the lamp;

FIG. 6 is a sectional view of a portion of two light pipes forming part of those shown in FIG. 1, specifically illustrating the way in which light coming from the lower light pipe enters and exits the top light pipe;

FIG. 6A shows a mirror reflector at the bottom side of a light pipe of FIG. 6;

DETAILED DESCRIPTION OF THE INVENTION

Figure 1:
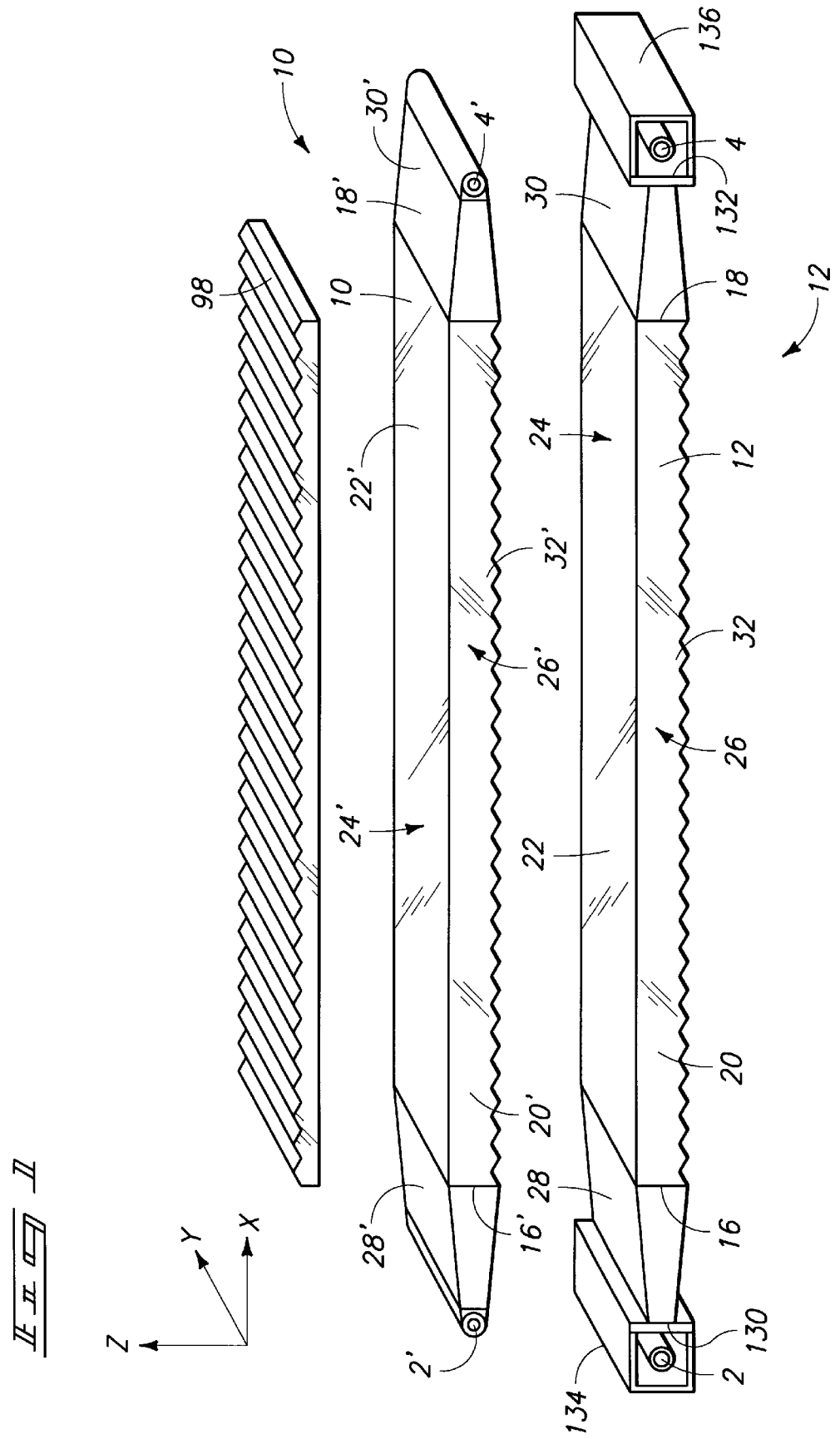
FIG. 1 is a perspective view of a dual mode stacked backlighting system using microprisms. The stacked backlighting system is shown in an x, y, z coordinate system for the purpose of convenience.

Turning now to the drawings, wherein like components are designated by like reference numerals throughout the various figures. It is to be understood that this invention is not limited to these particular physical parameters. Attention is first directed to FIG. 1 which shows a dual mode stacked lighting system using four linear light sources, cold cathode fluorescent lamps (CCFL) or hot cathode fluorescent lamps (HCFL). As indicated above, this figure illustrates in perspective view an assembly designed in accordance with this invention for backlighting a liquid crystal display. The assembly is composed mainly of two stacked light pipes shown as 10 and 12 within an x-y-z coordinate system. Each of the two light pipes has a generally rectangular shape extending in both the x-direction and y-direction. Each light pipe has opposite ends 16 and 18 (16' and 18'), and opposite sides 20 and 22 (20' and 22') and opposing top and bottom surfaces 24 and 26 (24' and 26') respectively. Arrangements indicated at 28 (28') and 30 (30') for light pipe 12 (10), is provided for directing light into the light pipe at each of the entrance ends of the light pipes.

Still referring to FIG. 1, each light pipe also includes an arrangement of immediately adjacent micro-prisms 32 and 32' extending in the y-z plane and serving as a bottom surface of light pipes 12 and 10 respectively. Each of the microprisms 32 and 32' has a triangular cross section with two light-reflecting sides. For the moment, it suffices to say that this arrangement of microprisms may be constructed of any suitable transparent material such as glass, acrylic or polycarbonate having the same or approximately the same index of refraction as the light pipes 12 and 10. Arrangement 32 (and 32') may be a separately made, distinct arrangement, for example from a separate sheet having a convex prism-featured surface, in which case the arrangement could be readily bonded to the side surfaces, 20 and 22, of the light pipe by means of a suitable adhesive having the appropriate index of refraction so as to be transparent to light passing between the light pipe and the sheet of microprisms. On the other hand, the arrangement of microprisms could be made an integrated part of the light pipe.

In FIG. 1, the size of the microprisms and the height of the light pipe sections have been exaggerated in order to better depict the way in which they act upon light introduced into the light pipe. A prismatic film 98 is used in this backlighting system to change the propagation direction of the output light beams to match the viewing angle of a display. Color filters 130 and 132 are placed between the lower light pipe and its light sources 2 and 4. By selectively turning lamp pairs 2 and 4 or 2' and 4' on, this backlighting system is capable of a multi-mode operation.

Figure 2:
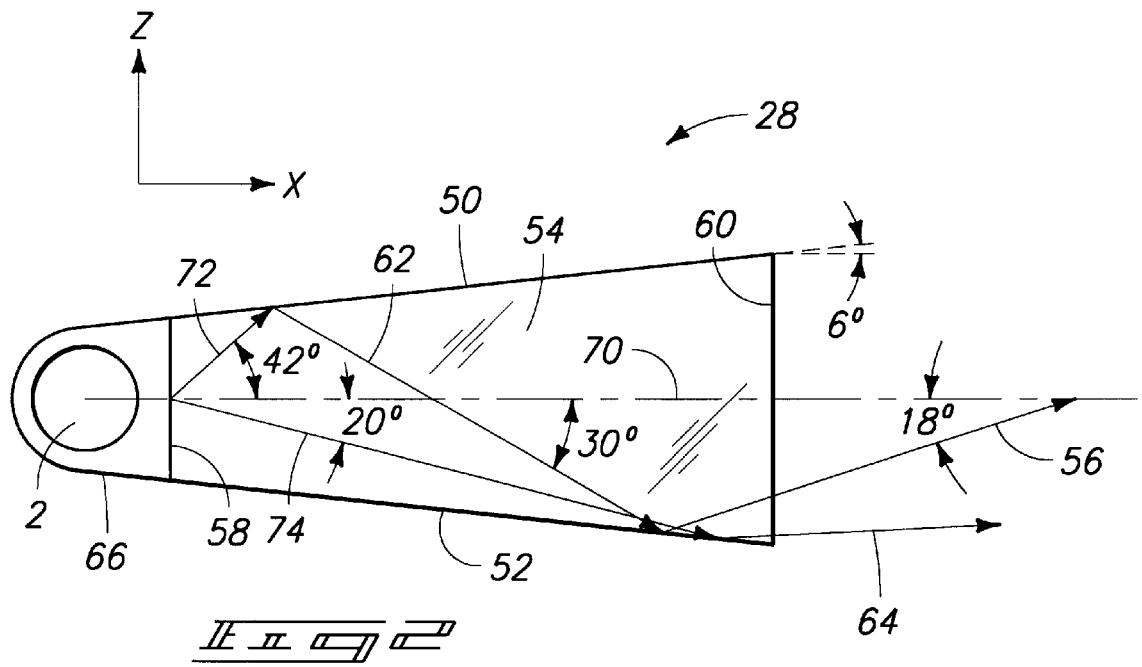
FIGS. 2 and 2A are sectional views of light directing assemblies, taken in x-z plane.

Turning now to FIG. 2, a section view of the arrangement 28 and the light source 2, shown in the x-y plane. Since the arrangements 28, 30, 28' and 30' are similar, only the functioning of 28 will be described in detail. The arrangement 28 includes a reflection prism 54. The prism 54 has opposing side surfaces 50 and 52, and opposing ends 58 and 60. Light entering the prism in the x-y plane has a maximum divergence angle determined by the index of refraction of the material that the prism is made of (42° if the prism is made of acrylic which has an index of refraction of 1.49).

To collimate light into a desired divergence range, for example, ±18° degrees in the x-y plane, the side surfaces 50 and 52 are constructed at a tilt angle, for example about 6° with respect to the x-axis, as illustrated in FIG. 2. As an example, light ray 72, which enters the reflection prism at a divergence angle of 42° with respect to the x-axis, will be reflected by a side surface 50 and then 52 of the reflection prism. With each reflection, the light ray will have its divergence angle decreased by 12° for a 6° tilted surface. As a result, the light ray 56 leaving the collimating section will have a divergence angle of 18° which is within the desired maximum divergence angle of ±18°. However, light rays, such as ray 74, which has a smaller initial divergence angle, for example 20°, will be reflected by the surface of the collimating light pipe only once within the entire light collimating assembly and will have its divergence angle decreased by 12°, shown as 64. In addition, light with divergence angle less than 6° will not hit the surface and will thus propagate through the collimating assembly with direction unchanged.

Figure 2A:
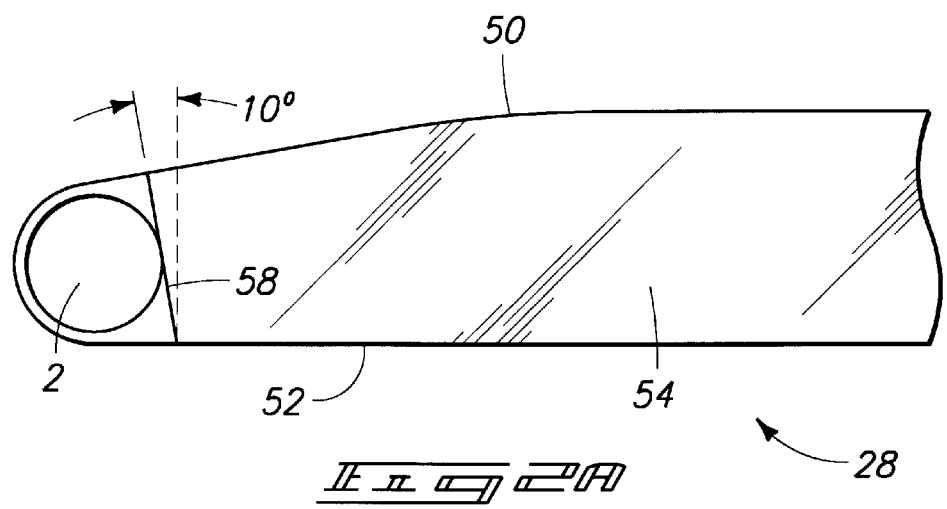

With a properly constructed collimating assembly, light rays with any incident angle will be collimated to have a divergence angle less than ±18°. The divergence angle may be further reduced by additional reflections at the tilted surfaces which may have its slope varied along the y-direction. Since all changes in propagation direction are a result of total internal reflection, there is no loss in their intensities. Although it is possible to use a conventional reflection surface, such as a plated parabola mirror, to collimate the light, it is far more efficient to collimate light by using a reflective surface based on total internal reflection. It is also understood that the sides of the light collimation section may have a curved surface area or even consist of segments of flat and curved surfaces for effective light collimation. The front surface 58 can be tilted with respect to the z-axis and the two side surfaces 50 and 52 may have different slope. FIG. 2A shows a second embodiment of the assembly 28. In this particular embodiment, the side surface 52 is parallel to the x-y plane, the entrance surface 58 is tilted upwards and the upper surface 50 has a curved shape.

Having described the way in which light from source 2 is directed by means of the light directing assembly 28, attention is now directed to the way in which light pipes 10 and 12 in cooperation with microprism arrangement 32 acts on the input light to provide output light 42. To this end, reference is directed to FIG. 3 which gives a cross sectional view of light pipe 10 and 12 in the x-y plane. For the purpose of this discussion, it will be assumed that the maximum divergence angle at which light enters the backlighting light pipe is ±18°, as depicted in FIG. 3. In the particular embodiment illustrated in FIG. 3, each prism 40 has its side surfaces 44 and 46 making an angle of 30° with the x-y plane. As mentioned above, it is to be understood that the this invention is not limited to these particular physical parameters. The material as well as the angle that the surface of the microprism makes with the top surface of the light pipe may all have different values. The reflecting microprisms may even have curved surfaces.

Still referring to FIG. 3, note specifically that the incoming light beam 80, which deviates by 18° from the x-y plane, will hit the surface of a prism, be bent by 60° and then propagate in the direction 82 which deviates by +12° from the normal direction 84. Light beam 90 which propagates nearly parallel to the x-axis will be bent by 60° and propagates in the direction 88 which deviates by +30° from the normal 84 to surface 24. Light beam 92 which initially deviates by −18° from the x-axis will hit the underside of the side surface 24 and then propagate towards -x direction whereupon it will be reflected by one surface of a microprism in a way similar to light beam 82, thereby propagating in the direction at an angle of +12° with the normal. This process happens to all light beams making a negative angle with the x-axis. As a result light beams exiting the light pipe through top surface 24 will be collimated to one-half their original divergence angles in the x-z plane, that is, one-half that at which light enters the light pipes 10 and 12. With the maximum divergence angle of light coming from the light collimating section less or equal to the critical angle of refraction with respect to the surface of the microprisms, no light (or a minimum) can escape the light pipe in the wrong side. However, if space is limited and the light can not be collimated to a sufficiently high degree of collimation for total internal reflection, then a reflecting film may be placed underneath the lower light pipe 12 to reflect light escaping out. Leakage light usually happens at large angle to the normal. With the current design, since light reflected out of the light pipe also happens at large angle, there is a good chance that some of the reflected light will exit with a desirable direction. Within this design, light output from the light pipe with angle varies from 12° to 30° inside the light pipe will have an exit angle from 18° to 48° in air as is determined from the Snell's law.

In the particular example described above in conjunction with FIG. 3, it was assumed that the microprism 42 has its side surfaces 44 and 46 making angles of 30° with its base. For the purpose of coupling light out of a light pipe, the prism-array should have an angle determined by the allowed divergence angle, output light propagation direction, and the index of refraction of the light pipe. A prism with a curved surface may also be used, as shown in FIG. 3A.

Figure 4:
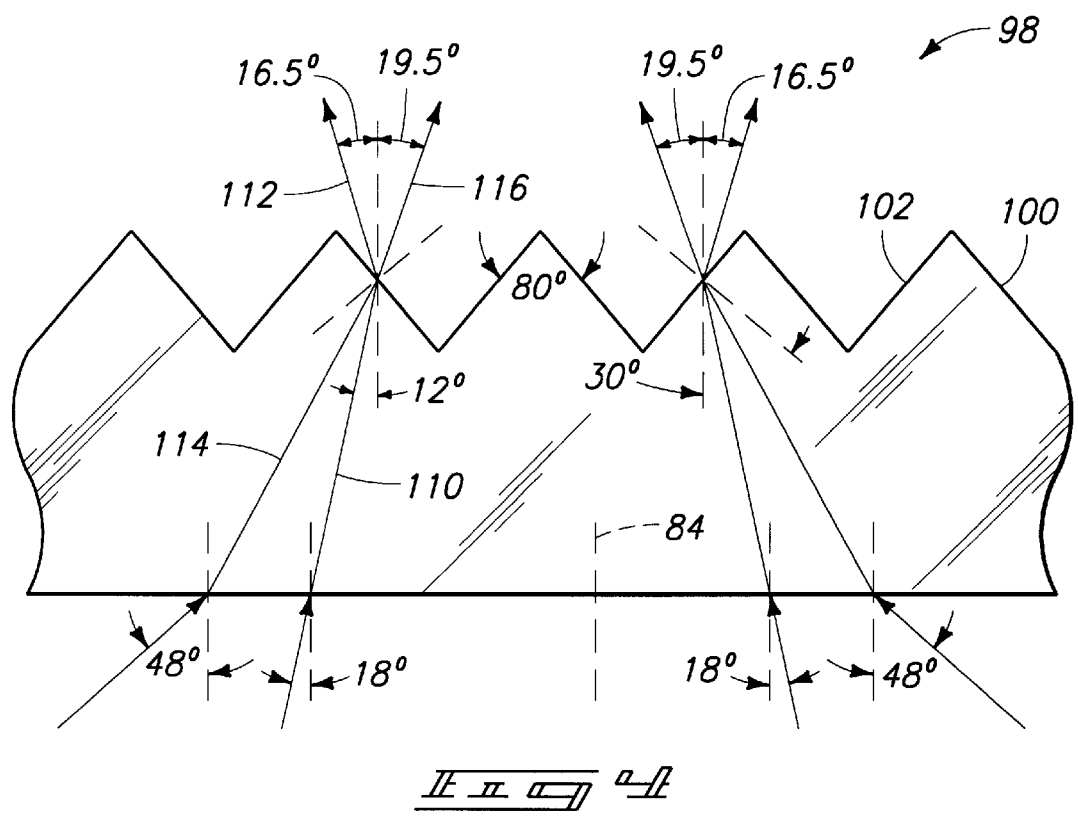
FIG. 4 is a perspective view of the use of a film to bend two light beams towards the same direction.

It is desirable to combine two light beams into a single beam. Using two light sources 2 and 4 located at opposing side of the light pipe, output light propagated off-normal, from +18° to +48° and from −18° to −48°. As shown in FIG. 4, a prismatic film 98 with prismatic angle of 80° is used to bend output light from the two CCFLs to the forward direction. Light ray 110 which has a deviation angle of 12° inside the film which is also made of acrylic will be bent by 28.5° towards the normal direction 84 and will propagate in the direction of 112 which deviates from the direction of 84 by −16.5°. Light ray 114 which has a deviation angle of 30° will be bent by −10.6° and will propagate in the direction of 116 which deviates from the direction of 84 by 19.4°. Similarly, light with deviation angle from −12° to −30° will hit the surface 102 of the film and will have the deviation angle changed to +16.5° and −19.4°. The two light beams coming from the two lamps each located on the opposite ends of a light pipe is now combined as a single beam propagate from −19.4° to +19.4°. This angular distribution of the combined output light matches the viewing angle of most LCDs in the x-z plane very well and is suitable for normal portable display device application. For applications which needs a narrower divergent angle but a brighter output, a prismatic film with a smaller angle, such as 70°, can be used to bend the two beams towards the normal direction. Similarly, a somewhat wider viewing angle can be achieved with a prismatic film with a larger angle such as 90°.

For a very wide viewing angle, such as ±40°, a prismatic film with a prism angle of a larger angle, for example 100° may be used. Light output from this film is composed of two beams with the peak intensity for each beam separated by approximately 40°. A diffuser, such as a holographic diffuser, may then be used to expand the divergent angle of both beams so the two beams overlap to achieve a divergent angle of ±40°.

Another embodiment to achieve a wide viewing angle is to use prismatic films of a curved surface. For the particular light pipe described above, a prismatic film with prisms having the two sides with curvature varying from 35° to 65°, for example, will give output light with a divergent angle of ±40°. A backlighting system with a very bright output and a wide divergent angle is suitable for video applications, for example.

For certain applications, such as automobile and airplane displays, the viewer, that is the driver or pilot, is usually looking down on the display. It is therefore desirable to have the output light from the backlighting system propagating in a direction tilted upwards. A Fresnel prism film is therefore placed on top of the light pipe to change the propagation direction of the output light to the desired direction. The Fresnel prism film has a periodic structure and can therefore cause interference patterns with the periodic structure of the LCD. This interference pattern can be eliminated by the use of a diffuser placed between the Fresnel film and the LCD panel.

A light pipe with microprisms adjacent to each other, may not provide output with uniformity since sections close to the lamp may give a brighter output. As is shown in FIG. 5 and 5A, this non-uniformity problem can be solved by keeping the density of microprisms low at sections of the light pipe close to a lamp and high at area away from the lamp. A higher density of microprisms can be designed to compensate for the reduced intensity of light inside the light pipe. The density of the microprisms is determined by the width of a flat section 120 separating adjacent microprisms. FIG. 5 shows the width of the flat section 120 (120A, 120b, 120C) decreases away from the lamp.

After the discussion of the functioning of a single light pipe, now consider the light propagation process of a backlighting system composed of two stacked light pipes. Since light propagation of the top light pipe is not affected by the presence of the lower light pipe, we need only to consider the propagation process of the light output from the lower light pipe.

Output light from the lower light pipe 12 has to pass through the upper light pipe 10 to be observed by a viewer 128. As is shown in FIG. 6, light could enter the upper light pipe 10 through any of the two surfaces, 44' and 46' respectively, of the microprisms structure of the upper light pipe or flat sections, 120 between microprisms. If the light beam enters the upper light pipe through the flat surface (between grooves), this light beam will exit the upper light pipe with no change in its propagation. If the output light from the lower light pipe enters the upper light pipe through surface 46' of the microprisms, it will be bent towards the normal direction and will enter the upper light pipe with an angle coincide approximately with the angle of output light from the upper light pipe. In FIG. 6, an example light beam 122 which exits the light pipe at an angle of 48° enters the top light pipe so that it will exit the top light pipe with an exit angle of 19° 124 inside the light pipe (30° in air) which is within the range of 12° to 30° as described earlier.

If the output light from the lower light pipe enters the upper light pipe through surface 44' of the microprisms, it will have an incident angle larger than the critical angle when it reaches the top surface of the upper light pipe, which will reflect it back to either surface 44' or 46' of microprisms in the lower surface of the upper light pipe. If this reflected light 132 hits the surface 44', the deviation angle will be reduced and this light ray 134 will become highly collimated. It will then be reflected out, as ray 136, of the upper light pipe the same way as the light entering the upper light pipe from its edge. If this reflected light hits surface 46', it will exit the upper light pipe and will be returned to the lower light pipe 12. Light returning to the lower light pipe will have a chance to hit surface 44, and become highly collimated. This light ray will repeat the process of coupling out of the light pipe by total internal reflection with a desired exit angle.

There is also a possibility that the light ray will hit surface 46 of microprisms located on the lower light pipe and leak out. Turning to FIG. 6A, a mirror reflector (film with metal coating such as a SILVERLUX film from 3M) 126 placed at the bottom side of the lower light pipe 12, this leakage light will be reflected back to the upper light pipe 10. The reflect light beam 148 will again repeat the above process of trying to exit the upper light pipe with the desired exit angle. This stacked flat collimator backlighting system is highly energy efficient and can nearly double the output brightness of a single light pipe configuration.

Now consider FIG. 1 again. In this diagram, two narrow color filters (such as the WAMCO NV-FLC-2 night vision color filter) 130, 132 are placed between the lower light pipe and its light sources. The color filters 130, 132 in this particular situation are used to eliminate long wavelength red and infrared light to make a two mode backlighting system compatible with the use of night vision goggles. The two lamps 2, 4 for the night vision mode are placed inside an opaque housing 134, 136 so that all of the light emitted from these two lamps has to go through the color filter before entering the light pipe. For day mode operation, the top two (or, all four) lamps 2' and 4', are turned on for a very bright output with a white color. For the night vision operation, only the bottom two lamps 2 and 4 are turned on. With all of the long wavelength red and infrared light absorbed by the filter the spectrum of this backlighting system is therefore compatible with the use of night vision goggles.

Figure 7:
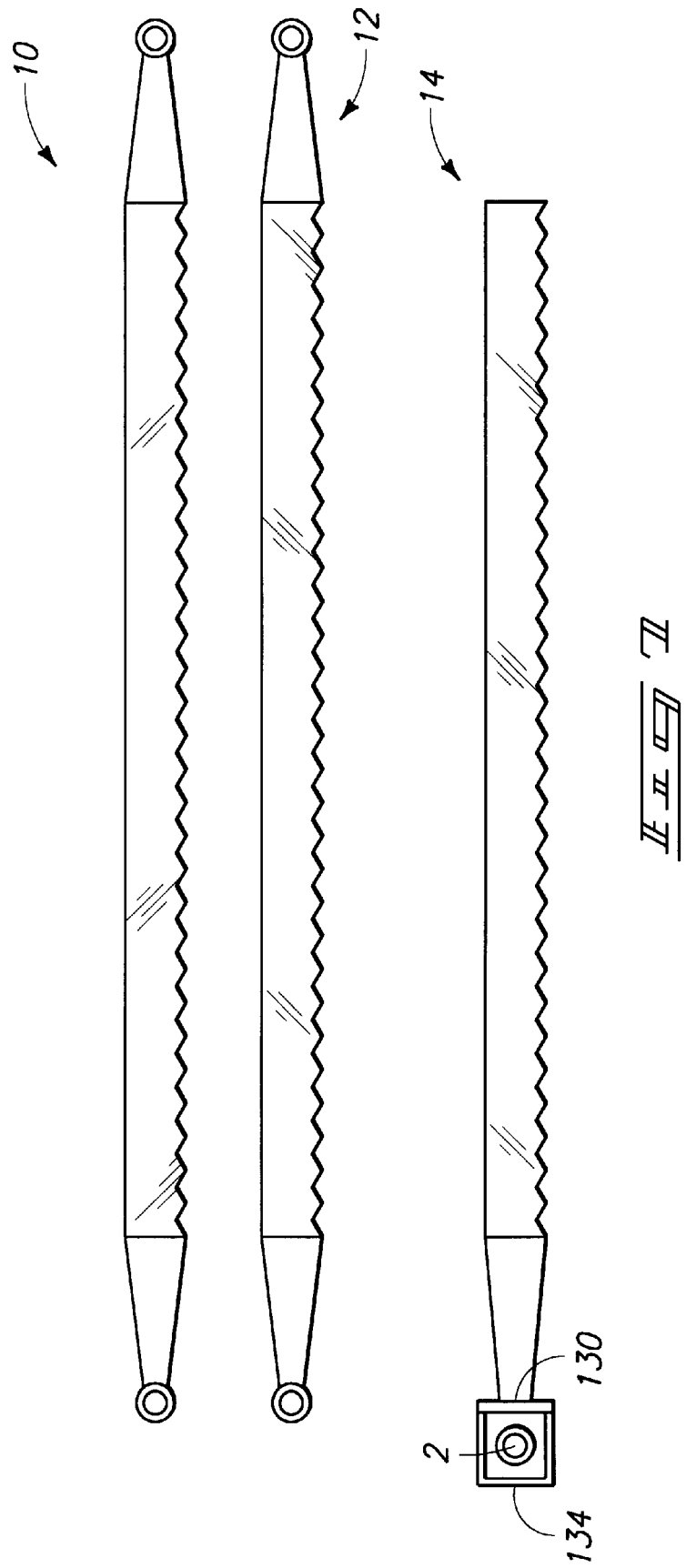
FIG. 7 is a perspective view of a backlighting system using three light pipes and five lamps.

Large size backlighting system for a sunlight readable display needs a very bright output for the day mode operation and the night vision mode does not need a very bright output. A backlighting system uses five lamps and three stacked light pipes 10, 12 and 14 shown in FIG. 7, is suitable for this application. In this embodiment, four lamps are used for day mode and only one lamp is used for the night vision mode.

Displays for outdoor applications need to have high brightness to be sunlight readable. However, if a display is too bright it might blind the viewer at night when the outside is very dark. In this situation, a high dimming ratio is desired. Since a CCFL needs to have a relatively high voltage to operate, dimming by reducing the input voltage is not a good solution. A high dimming ratio can be achieved through pulse modulation of the lamps. This dimming range, however, is still not adequate for some applications, such as avionics use. It is usually very difficult to increase the dimming range beyond a dimming ratio of 1,000:1.

For applications not required to be compatible with the use of a night vision goggle, the color filters can be removed. This backlighting system is still suitable for a multiple mode application with an enhanced dimming. Using the stacked light pipe technology, this backlighting system can have its dimming range increased by selectively turning some lamps off. In a 5 CCFL system, the day mode may have all of the five lamps turned on. For the night mode, only the lamp for the bottom light pipe is turned on. The dimming ratio can then be increased by a factor of over five. With the edge-lit stacked light pipe configuration, a stacked backlighting system maintains a good uniformity over the whole wide dimming range since light from each light pipe illuminates the whole display area. This arrangement achieves a very large dimming range. However, the spectra of these two modes are now identical for this particular case.

The backlighting system described above gives output light collimated in the x-z plane. For applications which do not need a wide viewing angle in the y-z plane, a backlighting system which gives a brighter output but are reduced divergent angle in that plane is desirable.

In the prior art, a Backlight Enhancement Film (BEF) made by 3M is widely used to achieve a brighter output with a reduced viewing angle. The backlighting system of this invention can also include a BEF, placed on top of the light pipe 10 to further increase the output brightness by collimating light in the y-z plane.

Figure 8A:
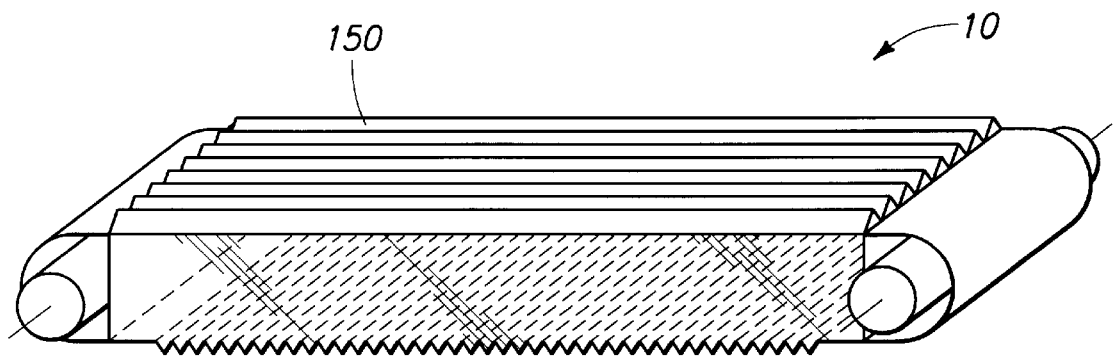
FIGS. 8A, 8B and 8C show different types of films in different positions relative to the light pipes.

FIG. 8A, the light pipe has microprisms located on both its top 150 and bottom 152 surfaces. The axis of the microprism in the top surface is perpendicular to that located on the bottom surface. With this arrangement, light inside the light pipe can only be reflected out by microprisms located on the bottom surface. Microprisms located on the tope surface, however, will bend light which is reflected out by bottom located on the tope surface, however, will bend light which is reflected out by bottom microprisms toward the normal direction, similar to light collimated by a BEF. Advantageously, the arrangement shown in FIG. 8A, however, eliminates two air/material interfaces and therefore reduces losses caused by reflection at the two air/material interfaces. Microprisms located on the surface do not reflect light out of the light pipe. However, by collimating light in the y-z plane, microprism structure on the top surface helps the propagation of the light towards areas further away from the light entrance side.

Figure 8B:
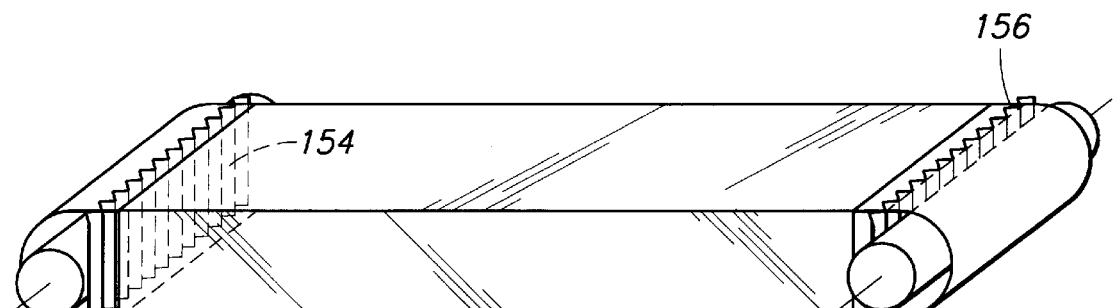

FIG. 8B demonstrates in a second unique method the use of a BEF to restrict the divergent angle of light in the y-z plane. In this embodiment, a first strip of BEF 154 is placed on a first entrance end of the light pipe. A second strip of BEF 156 is placed on the opposite entrance end. Light is collimated in the y-z plane before entering the light pipe. Since the light propagates in the light pipe by specular reflection, output light is still collimated in the y-z plane. This arrangement improves backlighting technology as the prior art depends on scattering to bring light out of the light pipe which is random so it destroys the collimation state of light.

Figure 8C:
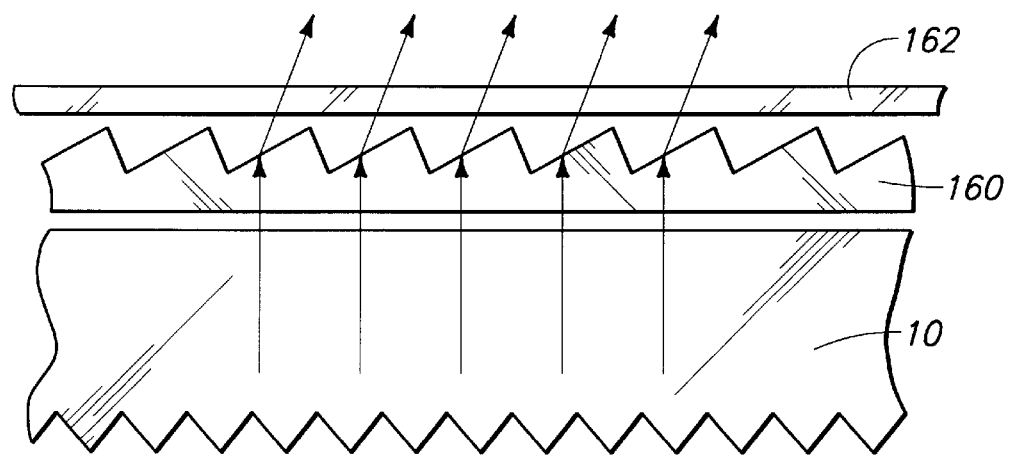

As mentioned above, displays for certain applications, such as automobile or airplane displays, are always viewed from the upper direction. For these displays, it is desirable to have the output light from the display titled in the upwards direction. FIG. 8C shows klan embodiment where a Fresnel film 160 is used to bend the backlight toward the viewer, usually a driver or pilot. The Fresnel film 160 may also be placed between the LCD 162 and the viewer 128 (see FIG. 6). A diffuser, such as a holographic diffuser, may be placed on top of the Fresnel film to eliminate interference caused by the periodic structure of the Fresnel film and the LCD panel to achieve a more uniform illumination. The holographic diffuse may also increase the viewing angle of the display by increasing the divergent angle of the light.

The stacked backlight assembly is highly efficient for both day and night vision mode operation. However, night vision mode usually requires only a very low brightness. Then light vision mode light pipe can therefore be replaced by a conventional, scattering based backlighting light pipe.

We claim:

1. A backlighting assembly having a particular viewing axis, comprising:

a plurality of light pipes, each including top and bottom surfaces which define a light pipe interior, each of said plurality of light pipes being configured to be illuminated by at least one linear light source at a light entering end, each of said plurality of light pipe further being configured to direct light from said at least one linear light source into a respective light pipe interior in a predetermined way;

wherein said plurality of light pipes are together assembled so that they are configured to provide multi-level modes of one-dimensional collimated illumination output light beams having at least one characteristic propagation direction; and a prismatic film substantially symmetric about the particular viewing axis adapted to intercept the multi-level modes of one-dimensional collimated illumination and bend the illumination toward the viewing axis.

2. A backlighting assembly as recited in claim 1 wherein said plurality of light pipes is two light pipes, configured in a stacked arrangement.

3. A backlighting assembly as recited in claim 1 wherein said plurality of light pipes is more than two light pipes, configured in a stacked arrangement.

4. A backlighting assembly as recited in claim 1 wherein said plurality of light pipes includes a plurality of linear light sources which are configured to be selectively illuminated.

5. A backlighting assembly as recited in claim 1 and wherein at least one of said plurality of light pipes further comprises:

an arrangement of immediately adjacent microprisms having surfaces at approximately between 26 and 36 degrees from said light pipe's bottom surface distributed over one surface of said at last one light pipe, each of said microprisms with its surfaces facing a particular side of the light pipe forming a reflecting surface segments for reflecting light by total internal reflection within said light pipe through one of its side surfaces in a collimated way.

6. A backlighting assembly as recited in claim 1 wherein said at least one light source is a lamp.

7. A backlighting assembly as recited in claim 6 wherein in at least one of said plurality of light pipes, a color filter is placed between said lamp and said light pipe interior.

8. A backlighting assembly as recited in claim 1 wherein the position of said at least one light source defines the light entrance side of said light pipe interior, said backlighting assembly further comprising:

in at least one of said plurality of light pipes, a film with microprisms is placed on the light entrance side to collimate light.

9. A backlighting assembly as recited in claim 1 wherein on at least one of said plurality of light pipes, said top surface is composed of microprisms having a first axis and the bottom surface is composed of microprisms having a second axis, wherein said first axis is perpendicular to said second axis.

10. A backlighting assembly as recited in claim 1 wherein said plurality of light pipes are further together assembled so that they are configured to provide multi-spectra modes of operation.

11. A method for providing a backlighting assembly having a particular viewing axis, comprising the steps of:

providing a plurality of light pipes, each including top and bottom surfaces which define a light pipe interior, each of said plurality of light pipes being configured to be illuminated by at least one linear light source at a light entering end, each of said plurality of light pipe further being configured to direct light from said at least one linear light source into a respective light pipe interior in a predetermined way;

stacking said plurality of light pipes so that together they are configured to provide multi-level modes of one-dimensional collimated illumination output light beams having at least one characteristic propagation direction; and passing the output light beams through a prismatic film substantially symmetric about the particular viewing axis and bending the beams toward the viewing axis.

12. A method as recited in claim 11 further comprising the steps of:

providing to one of said light pipes, an arrangement of immediately adjacent microprisms having surfaces at approximately between 26 and 36 degrees from said light pipe's bottom surface distributed over one surface of said at last one light pipe, each of said microprisms with its surfaces facing a particular side of the light pipe forming a reflecting surface segments for reflecting light by total internal reflection within said light pipe through one of its side surfaces in a collimated way.

13. A method as recited in claim 11, further comprising the steps of:

in at least one of said plurality of light pipes, placing a color filter between said light source and said light pipe interior.

14. A method as recited in claim 11, further comprising the steps of:

configuring said backlighting assembly so said light sources are capable of being selectively illuminated.

15. A backlighting assembly comprising:

first and second light pipes, each including top and bottom surfaces which define a light pipe interior;

illumination means coupled to a first light entering end of the first light pipe and an opposed second light entering end of the light pipe;

illumination means coupled to a light entering end of the second light pipe, wherein said plurality of light pipes are together assembled so that they are configured to provide multi-level modes of one-dimensional collimated illumination; and a prismatic film substantially symmetric about the particular viewing axis adapted to intercept the multi-level modes of one-dimensional collimated illumination and bend the illumination toward the viewing axis.

* * * * *